(12) United States Patent
Weiss

(10) Patent No.: US 8,827,068 B2
(45) Date of Patent: Sep. 9, 2014

(54) DEVICE FOR DISTRIBUTING BAKED GOODS

(75) Inventor: Reinald Weiss, Schopfloch (DE)

(73) Assignee: R. Weiss Verpackungstechnik GmbH & Co. KG, Crailsheim (DE)

(*) Notice: Subject to any disclaimer, the term of this patent is extended or adjusted under 35 U.S.C. 154(b) by 47 days.

(21) Appl. No.: 13/322,688

(22) PCT Filed: May 28, 2010

(86) PCT No.: PCT/EP2010/057395
§ 371 (c)(1),
(2), (4) Date: Nov. 28, 2011

(87) PCT Pub. No.: WO2010/136556
PCT Pub. Date: Dec. 2, 2010

(65) Prior Publication Data
US 2012/0111698 A1    May 10, 2012

(30) Foreign Application Priority Data
May 29, 2009 (DE) .......................... 10 2009 026 620

(51) Int. Cl.
*A21B 1/48* (2006.01)

(52) U.S. Cl.
USPC .......................... 198/456; 198/602; 99/443 C

(58) Field of Classification Search
USPC .................................. 198/602, 456; 99/43 C
See application file for complete search history.

(56) References Cited

U.S. PATENT DOCUMENTS

| | | | |
|---|---|---|---|
| 4,100,848 A | 7/1978 | Grissinger | |
| 4,274,551 A * | 6/1981 | Hicks | 221/78 |
| 5,078,255 A * | 1/1992 | Haley | 198/358 |
| 5,435,430 A * | 7/1995 | Steiner et al. | 198/370.05 |
| 5,640,833 A * | 6/1997 | Gerber | 53/443 |
| 8,113,108 B2 * | 2/2012 | Weiss | 99/443 C |
| 2008/0163762 A1 | 7/2008 | Weiss | |
| 2011/0114445 A1 * | 5/2011 | Feigel et al. | 198/418.6 |

FOREIGN PATENT DOCUMENTS

| | | |
|---|---|---|
| DE | 31 45 792 A1 | 9/1982 |
| DE | 38 15 466 A1 | 11/1989 |
| DE | 101 16 423 A1 | 10/2002 |

(Continued)

OTHER PUBLICATIONS

German Patent Office Search Report, Mar. 5, 2010.

(Continued)

*Primary Examiner* — Ramya Burgess
*Assistant Examiner* — Thomas Randazzo
(74) *Attorney, Agent, or Firm* — Dority & Manning, P.A.

(57) ABSTRACT

The invention relates to a device for distributing baked goods, for combining with a continuous baking oven (1) arranged upstream of said device, said device comprising a plurality of peripheral carriers (6) for storing the baked goods (B), and transfer means (9, 10, 11, 12) for transferring the baked goods (B) from the carriers (6) to the dispensing means (21, 22, 23, 24) comprising a distribution device (21) and a dispensing compartment (24) for transferring the baked goods (B) from the distribution device (21) to the dispensing compartment (24). The device according to the invention is characterized in that the dispensing means (21, 22, 23, 24) also comprise an intermediate conveyor device (22), the distribution device (21) being loaded with baked goods (B) directly from the transfer means (9, 10, 11, 12) and also from the intermediate conveyor device (22) arranged between the transfer means (9, 10, 11, 12) and the distribution device (21).

11 Claims, 2 Drawing Sheets

(56) References Cited

FOREIGN PATENT DOCUMENTS

| | | | | |
|---|---|---|---|---|
| DE | 203 02 346 U1 | 5/2003 | | |
| DE | 10 2004 019 905 A1 | 11/2005 | | |
| DE | EP 1688042 | * | 2/2006 | ............... A21B 1/46 |
| DE | 10 2004 052 982 A1 | 5/2006 | | |
| DE | 10 2005 005 193 A1 | 8/2006 | | |
| DE | 10 2005 012 536 A1 | 9/2006 | | |
| DE | EP 1688042 | * | 9/2006 | ............... A21B 7/00 |
| EP | 1 591 970 A1 | 11/2005 | | |
| EP | 1 612 746 A1 | 1/2006 | | |
| EP | 1 617 385 A2 | 1/2006 | | |
| EP | 1 680 961 A2 | 7/2006 | | |
| EP | 1 688 042 A2 | 8/2006 | | |
| GB | 2 308 287 | 6/1997 | | |
| WO | WO 91/12597 | 8/1991 | | |
| WO | WO 98/25240 | 6/1998 | | |

OTHER PUBLICATIONS

PCT Search Report, Sep. 3, 2010.
International Preliminary Report on Patentability, Dec. 29, 2011.

\* cited by examiner ical for installation in supermarkets is known from EP 1 688
DEVICE FOR DISTRIBUTING BAKED GOODS

BACKGROUND

This invention refers to a device for dispensing baked goods that combines with an upstream continuous baking oven.

Such devices for dispensing baked goods with an automatic continuous baking oven mounted upstream used especially for installation in supermarkets is known from EP 1 688 042 A2, for example, in which a conveyor belt running parallel to the front of a dispensing unit transports fully baked rolls to a chute through which they fall into a dispensing compartment or directly into a bag. Wider baguettes, on the other hand, are dropped forward and can be taken from a dispensing compartment.

However, there is still demand for a device allowing fast and at the same time space-saving dispensing of baked goods. Making such a device available is a task of this invention.

SUMMARY

Additional objects and advantages of the invention will be set forth in part in the following description, or may be obvious from the description, or may be learned through practice of the invention.

In accordance with aspects of the invention, a device is provided for dispensing baked goods for combination with a continuous baking oven mounted upstream having a plurality of peripheral carriers for storing the baked goods, and with transfer means for transferring the baked goods from the carriers to the dispensing means. The device includes a delivery device and a dispensing compartment for transferring the baked goods from the delivery device to the dispensing compartment. The dispensing means additionally have an intermediate conveyor device, wherein the delivery device can be loaded with baked goods, on the one hand, directly by the transfer means and, on the other hand, by the intermediate conveyor device mounted between the transfer means and the delivery device.

The advantages of the invention lie especially in the fact that the delivery device can be loaded on the one hand with at least one baked good by one of the transfer means and on the other hand additional baked goods make a detour through the intermediate conveyor device before they reach the delivery device. Accordingly, the delivery device can be loaded both directly by a transfer means and by the intermediate conveyor device with at least one baked good. First of all, a transfer means loads the delivery device and after a customer request for further transfer, at least one baked good is sent to the dispensing compartment. Afterwards, the intermediate conveyor devices transport at least one additional baked good to the delivery device. Such a division saves a lot of space, but at the same time also allows an extremely fast re-supply of baked goods to the delivery device.

According to the previous paragraph, it is useful for the baked goods to be transported, on the one hand, towards the delivery device directly from one of the transfer means and, on the other hand, from the intermediate conveyor device in largely perpendicular direction to one another. This allows the device to utilize available space optimally, something that is especially important in supermarkets, where rigorous space management is the norm.

It is especially advantageous for the delivery device to be executed as a tilting conveyor, in accordance with aspects of the invention. This design allows an especially gentle diversion of the baked goods. The undesired chipping off of the crust of the baked goods is effectively prevented. In addition, a tilting conveyor occupies little space because its length can be selected according to a baked good. In particular, the swiveling axis of the tilting conveyor can run parallel to the dispensing front or—preferably—perpendicularly to it. A slide can be attached to the tilting conveyor for guiding the baked goods to a dispensing compartment.

An additional advantageous and space-saving design feature foresees the delivery device and the intermediate conveyor device to be arranged side by side—and preferably aligned flush with respect to one another—so they can have together largely the width of one carrier. In this arrangement, the delivery device and the intermediate conveyor device run advantageously parallel to the front side of the system, in which case this front side generally faces the supermarket's sales area or something similar (i.e. the customer).

Generally, the baked goods are arranged side by side on each carrier, and the carriers are oriented parallel to the dispensing front of the dispensing unit. The double loading of the delivery unit allows the transfer means to transport at least one baked good from one of the carriers directly to the delivery device, while the other baked goods on this transfer means are transported for the time being to the intermediate conveyor device. In this case, the transportation directions of the baked goods to the delivery device and to the intermediate conveyor device are the same and preferably face the dispensing front or the device's front side that faces the customer. After the delivery device has been emptied, the baked good closest to the delivery device can then be transported—parallel to the system's front side—from the intermediate conveyor device to the delivery device.

A corresponding, advantageous further development foresees the intermediate conveyor device to have at least one linear conveyor, preferably executed as conveyor belt capable of transporting the baked goods in cycles to the delivery device.

The transfer means may preferably include dropping means for the baked goods—for dropping the baked goods off the carriers, for example. These dropping means can be executed as swiveling devices that swivel a carrier in such a way that the baked goods on it slide off.

The transfer means can also be preferably executed as electronically-controlled sliders, especially for transporting the baked goods to the intermediate conveyor device and the delivery device.

An advantageous embodiment foresees the transfer means to include a temporary storage compartment for the baked goods, in which case the baked goods from the carriers are stored for the time being in this temporary storage compartment and then transported to the delivery device and the intermediate conveyor device. Such a design reduces a customer's waiting time in case all the baked goods that used to be in the delivery device and the intermediate conveyor device are sold out. Without a temporary storage compartment, the re-supply of a correspondingly loaded carrier can sometimes be time consuming owing to its travel duration and the customer might be annoyed by the ensuing waiting time.

It is advantageous if the sliders of the transfer means can be controlled independently from one another. With this feature, and depending on full or partial loading of the carriers and/or loading of the delivery device and intermediate conveyor device, a corresponding individual transfer of the individual baked goods can take place. In other words, no single slider is responsible for all baked goods that must be transported to the delivery device and intermediate conveyor device. Rather, one single slider can be provided for each baked good. Alternatively, one slider is provided for several, but not all, baked goods.

In another design also deemed as a separate aspect of the invention, the temporary storage compartment mentioned above is also provided and designed for the constant simultaneous loading of numerous baked goods, whereas for the transportation of the baked goods from the temporary storage compartment, the previously mentioned individually controllable sliders are provided. The temporary storage compartment can be loaded, for example, by a wide slider that grasps all baked goods or by a common dropping off of the baked goods from a carrier. The conveyance devices for loading the temporary storage compartment and transporting the goods from it are preferably equal.

Especially preferred is an electronic control device for controlling the movements of the carriers, the transfer means, the intermediate conveyor device and the delivery device. With correspondingly arranged sensors, the loading status of the various elements in the different positions can be measured and adjusted according to customer demands or requests.

The invention likewise applies to an automatic baking machine equipped with a continuous baking oven and to a device mounted downstream from the oven as described above.

BRIEF DESCRIPTION OF THE DRAWINGS

The invention will now be described in more detail with the help of the figures, which show schematically.

DESCRIPTION

Figure 2:
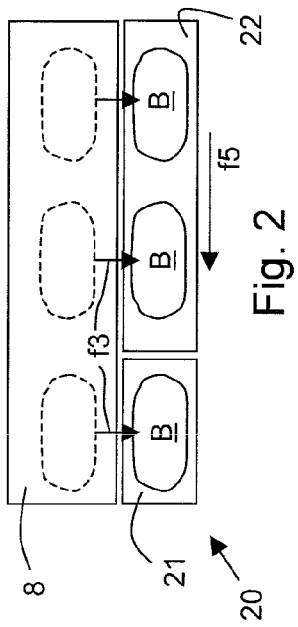
FIG. 2 a top view of a part of the device's dispensing unit according to FIG. 1.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 3:
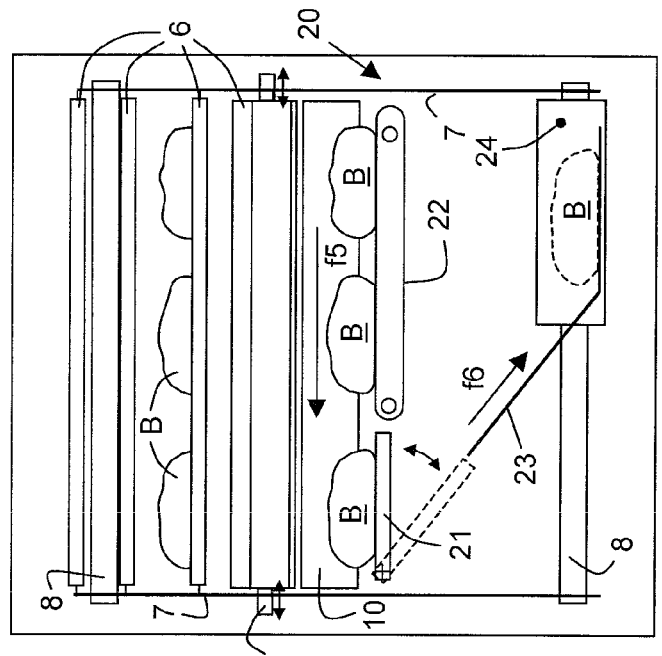
FIG. 3 a front view of the device according to FIGS. 1 & 2 (with front sheathing removed)
Figure 1:
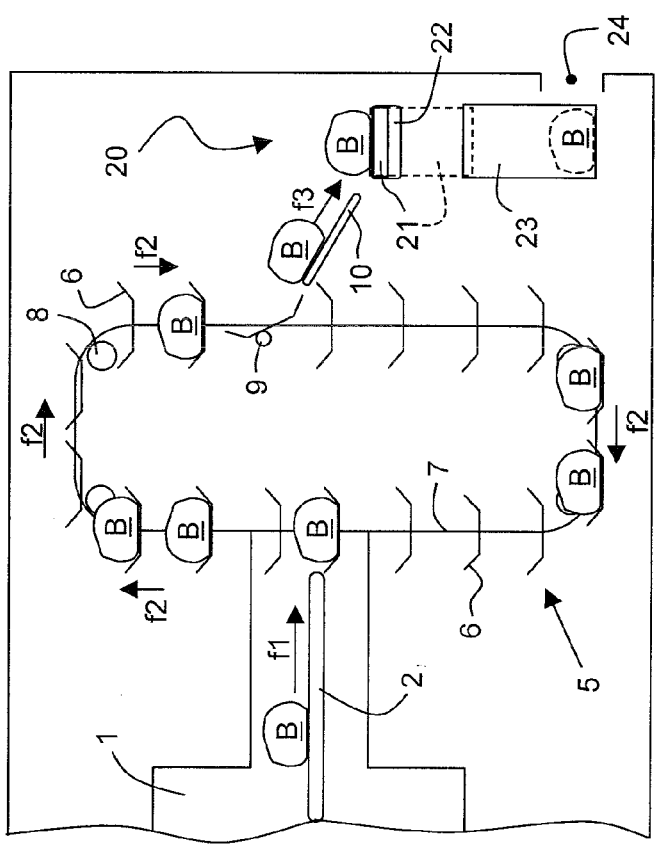
FIG. 1 a side view of a storage unit and a dispensing unit (with lateral sheathing removed) and a baking oven mounted upstream.

FIGS. 1-3 show a first embodiment of a device according to the invention, in which a continuous baking oven 1 is mounted upstream of a storage unit 5 and a dispensing unit 20. The baking oven 1 is preferably a part of an automatic baking machine for set-up in a supermarket or similar facility in which a conveyor belt 2 transports several baked goods B (here, loaves of bread B) that have been thoroughly baked and run side-by-side through the baking oven 1 to the storage unit 5 (arrow f1), where they are placed in a relatively unchanged position. In the embodiments according to the figures, each carrier 6 takes three loaves of bread B and lays them side by side. The front side areas of many carriers 6 moving peripherally (arrow f2) are attached to continuous conveyor chains 7, which are deflected by diverting rollers 8.

The carriers 6 have been designed for swiveling and can therefore, by a swiveling motion, deposit the baked goods B placed on them on a guiding sheet metal 10 that leads downwards (arrow f3) and faces the dispensing unit 20. The tilting of the carriers 6 slightly above the guiding sheet metal 10 is accomplished by laterally arranged and linearly moveable cogs 9 that are moved on top of one another from their resting position in the axial direction of the carriers 6 by an electronic control when baked goods B are requested. The outer underside of the corresponding carrier 6 slides along both cogs 9 and tilts the carrier 6 (see FIG. 1). The baked goods B on this carrier then slide downwards (arrow f3) on the guiding sheet metal 10, while the carrier 6 swivels back to its normal position after passing the cogs 9, and the cogs 9 are moved to their resting position.

According to the embodiment shown in FIGS. 1-3, the baked goods B reach two different dispensing means of the dispensing unit 20 (arrow 3 in each case) from the guiding sheet metal 10. These are, on the one hand, an intermediate conveyor device 22 and, on the other hand, a delivery device 21 arranged beside it, here executed as tilting conveyor 21, wherein both devices 21, 22 run flush parallel together to the front side of the device. In this case, the intermediate conveyor device 22 picks up two loaves of bread B, while one loaf of bread B reaches the tilting conveyor 21. An electronic control command can swivel the tilting conveyor 21 downwards when a customer requests a loaf of bread B (see especially the short dashes of the tilting conveyor 21 in FIG. 3 and the associated double arrow). Here, the bread B deposited on the tilting conveyor slides along a dispensing slide 23 (arrow f6) to a dispensing compartment 24 accessible to the customer from the front side of the device.

After swiveling to an upper position, the tilting conveyor 21 can pick up another loaf of bread B, which is transferred from the intermediate conveyor device 22 that runs electronically in cycles and is in this case executed as a linear conveyor belt, to the tilting conveyor 21 (arrow f5). The tilting conveyor 21 is preferably loaded with a new customer request without previous waiting, as it just has to be merely swiveled when the next request arrives in order to guide a loaf of bread into the dispensing compartment 24.

When both the tilting conveyor 21 and the intermediate conveyor device 22 are empty, a corresponding command of the electronic control device (not shown) moves a carrier 6 loaded with loaves of bread B to the guiding sheet metal 8 so three loaves of bread B are dropped off to the tilting conveyor 21 and the intermediate conveyor device 22, wherefrom a customer request can be quickly taken care of.

Figure 5:
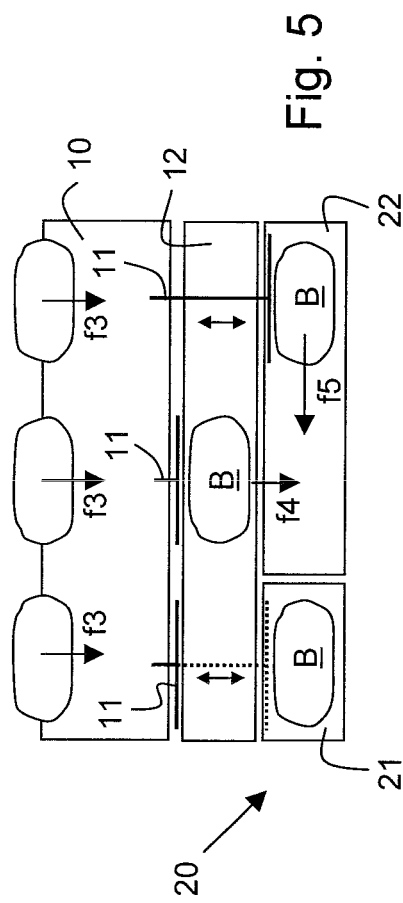
FIG. 5 a top view of a part of the dispensing unit of the device according to FIG. 4, and FIG. 6 a partial front view of the device according to FIGS. 4 & 5 (with front sheathing removed).
Figure 6:
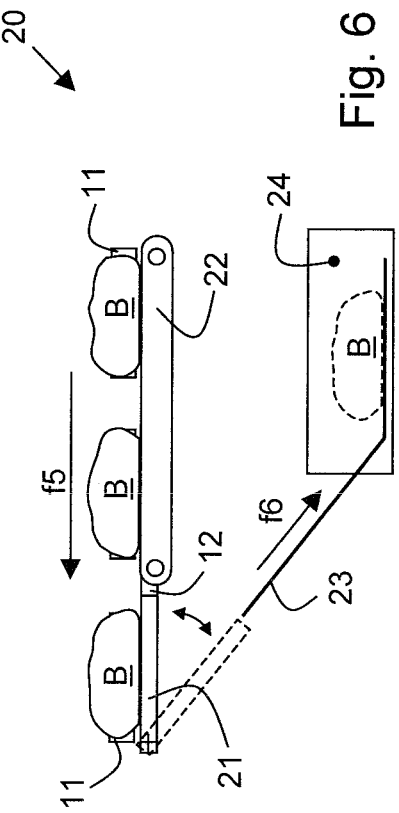
Figure 4:
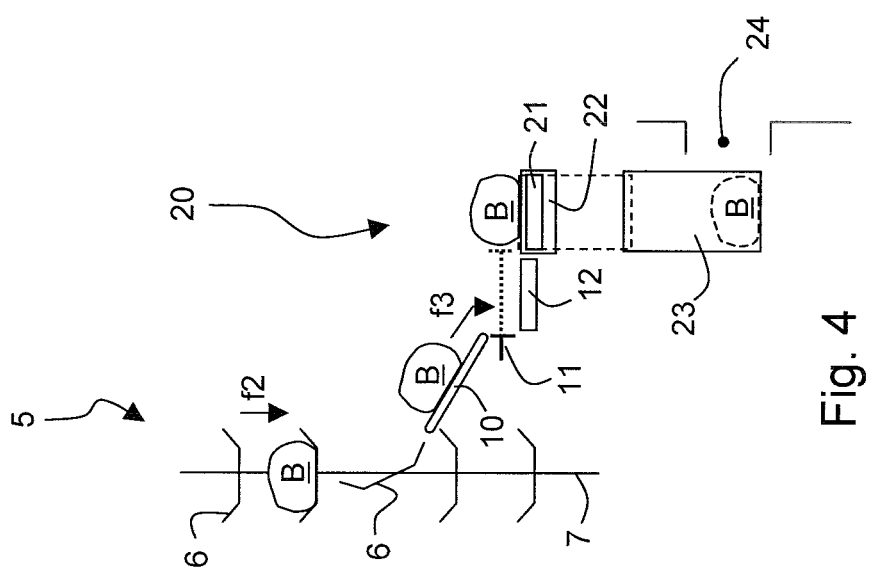
FIG. 4 a partial side view of a second embodiment of a device according to the invention.

A second embodiment of the device according to the invention is shown in FIGS. 4-6. Here, only partial cutouts are reproduced. The features that are not shown can especially—and readily—correspond to the embodiment shown in FIGS. 1-3. The important difference between the two embodiments is that in the one shown in FIGS. 4-6, a temporary storage compartment 12 has been provided that the loaves of bread B led by the guiding sheet metal 10 (arrow f3) reach for temporary storage therein. If the tilting conveyor 21 and the intermediate conveyor device 22 are empty, they can be filled without delay by the temporary storage compartment 12 (arrow f4). To achieve this, sliders 11 controlled independently from one another have been provided (shown dashed in FIG. 4), in which case one slider 11 each pushes one individual loaf of bread B from the temporary storage compartment 12 to the tilting conveyor 21 and the intermediate conveyor device 22.

Here, the sliding direction (arrow f4) is perpendicular to the transporting direction of the intermediate conveyor device 22 to the tilting conveyor 21 (arrow f5).

Owing to the temporary storage compartment 12, a provision of bread B is possible that ensures a fast re-supply of the delivery device 21 when there are several customer requests following in quick succession. If after dispensing the first three loaves of bread B more than three loaves of bread B are ordered in very short intervals—without taking the position and loading of the individual carriers 6 into account—three additional loaves of bread B can be very quickly transported from the temporary storage compartment 12 on the delivery device 21 (executed here as tilting conveyor) or conveyor device 22. The arrows f3 in FIG. 5 indicate the loading of a temporary storage compartment 12 with three additional loaves of bread B that used to be on a common carrier 6.

The delivery device 21 with its loading options—both directly from the transfer means and indirectly by interposing the intermediate conveyor device—offers the advantage of compact and quick dispensing of the loaves of bread B. A chipping off of the bread crust is also largely prevented by the gentle forwarding of the loaves of bread B if the delivery device is additionally executed as tilting conveyor 21, as shown here, since in this case the loaves of bread B don't have to overcome a high falling distance. Furthermore, the tilting conveyor 21 does not protrude sideways from the carriers 6—when seen from the device's front side—so that the width of the device can be kept very low (see especially FIGS. 2, 3 & 5, 6).

The following applies to both embodiments shown in the figures: The transportation direction from the transfer means 10 or 10, 11 & 12 onto the tilting conveyor 21 and the intermediate conveyor device 22 (arrow f3 or arrows 3 & 4), respectively, is perpendicular to the direction in which the baked goods B are being transported from the intermediate conveyor device 22 onto the tilting conveyor 21 (arrow f5).

The embodiments used as examples should not be understood as being final. Variations within the claims are certainly possible. Thus, for example, sliders for emptying the carriers can be provided. The intermediate conveyor device can also be executed as one or several tilting conveyors. In addition, the delivery device does not necessarily have to be executed as a tilting conveyor, even if this design is currently preferred owing to the gentle forwarding of the baked goods.

The invention claimed is:

1. A device for dispensing baked goods received from a continuous baking oven, comprising:
    a plurality of travelling carriers disposed in a looped conveying path to receive the baked goods from the baking oven as said carriers move past said baking oven;
    a dispensing mechanism disposed to receive the baked goods from the plurality of carriers and transfer the baked goods to a dispensing compartment;
    a transfer mechanism operably configured between said carriers and said dispensing mechanism to move the baked goods from said carriers to said dispensing mechanism;
    said dispensing mechanism further comprising a delivery device that moves the baked goods to said dispensing compartment, said delivery device operably disposed adjacent said transfer mechanism to receive baked goods directly from said transfer mechanism;
    an intermediate conveyor disposed adjacent said transfer mechanism and side-by-side with said delivery device so as to also receive baked goods directly from said transfer mechanism and to subsequently convey the baked goods to said delivery device;
    said delivery device comprising a tiltable member disposed above said dispensing compartment, wherein said tiltable member tilts to deposit the baked goods into said dispensing compartment; and
    wherein said tiltable member receives baked goods from said transfer mechanism in a first direction and from said side-by-side intermediate conveyor in a second linear direction that is different from said first direction.

2. The device as in claim 1, wherein said intermediate conveyor and said transfer mechanism are disposed relative to said delivery device such that movement of the baked goods from said transfer mechanism directly to said delivery device is perpendicular to movement of the baked goods from said intermediate conveyor to said delivery device.

3. The device as in claim 2, wherein said delivery device and said intermediate conveyor have a combined width generally equal to a width of said transfer mechanism.

4. The device as in claim 1, further comprising a dispensing slide disposed between said tiltable member and said dispensing compartment.

5. The device as in claim 1, wherein said transfer mechanism further comprises a temporary storage compartment for the baked goods from which the baked goods are delivered to delivery device and intermediate conveyor.

6. The device as in claim 5, further comprising electronically controlled sliders disposed to move the baked goods from said temporary storage compartment onto said delivery device and said intermediate conveyor.

7. The device as in claim 6, wherein a respective said slider is provided for moving baked goods onto said delivery device and a separate said slider is provided for moving baked goods onto said intermediate conveyor.

8. The device as in claim 7, wherein said sliders are independently controllable.

9. The device as in claim 1, wherein said carriers are pivotally mounted on a conveyor, said transfer mechanism comprising a cog disposed in a running path of said conveyor to engage and cause said carriers to pivot and deposit the baked goods.

10. The device as in claim 1, wherein further comprising an electronic controller interfaced with said carriers, said transfer mechanism, said intermediate conveyor, and said delivery device for automated coordinated control of said device.

11. An automatic baking machine, comprising:
    a continuous baking oven;
    a device disposed downstream of said baking oven for dispensing baked goods received from said baking oven, said device further comprising:
    plurality of travelling carriers disposed in a looped conveying path to receive the baked goods from the baking oven as said carriers move past said baking oven;
    a dispensing mechanism disposed to receive the baked goods from the plurality of carriers and transfer the baked goods to a dispensing compartment;
    a transfer mechanism operably configured between said carriers and said dispensing mechanism to move the baked goods from said carriers to said dispensing mechanism;
    said dispensing mechanism further comprising a delivery device that moves the baked goods to said dispensing compartment, said delivery device operably disposed adjacent said transfer mechanism to receive baked goods directly from said transfer mechanism;
    an intermediate conveyor disposed adjacent said transfer mechanism and side-by-side with said delivery device so as to also receive baked goods from said transfer mechanism and to subsequently convey the baked goods to said delivery device;

said delivery device comprising a tiltable member disposed above said dispensing compartment, wherein said tiltable member tilts to deposit the baked goods into said dispensing compartment; and wherein said tiltable member receives baked goods directly from said transfer mechanism in a first direction and from said side-by-side intermediate conveyor in a second linear direction that is different from said first direction.

\* \* \* \* \*